Patented Feb. 19, 1929.

1,702,301

UNITED STATES PATENT OFFICE.

MAX JAEGER, WILHELM MOSCHEL, AND ROBERT SUCHY, OF BITTERFELD, GERMANY, ASSIGNORS TO THE FIRM I. G. FARBENINDUSTRIE AKTIENGESELLSCHAFT, OF FRANKFORT-ON-THE-MAIN, GERMANY.

PROCESS FOR PRODUCING METAL CHLORIDES FREE FROM WATER AND OXIDES.

No Drawing. Application filed April 23, 1927, Serial No. 186,168, and in Germany January 15, 1926.

This invention relates to the production of anhydrous chlorides free from oxides or corresponding substances containing oxides or from hydrated chlorides, but more especially to the production of anhydrous magnesium chloride.

Several processes for obtaining anhydrous magnesium chloride are known, according to which magnesia is subjected to the action of hydrochloric gas, or mixtures of magnesia and reducing substances, as, in the first place, carbon, are subjected to the action of chlorine at elevated temperatures. In carrying out these processes, a difficulty arises due to the fact that when treating a coherent melt containing magnesia with hydrochloric or chlorine gas, in a crucible, for instance, the transformation of the magnesia remains incomplete because too little a quantity of gas is dissolved by the melt during the passage of the gas and caused to react with the magnesia. Therefore it has been proposed to carry out the reaction under such conditions of temperature that the resulting mixtures of magnesia and magnesium chloride, or magnesia, carbon and magnesium chloride respectively, remain continuously unmolten. In this manner the transformation may indeed be almost thoroughly accomplished, however, with such a process the transformation of the last portions of magnesium oxide requires too much time owing to the fact that any rise of temperature above the sintering or fusing point of the magnesium chloride-magnesia mixture must be avoided.

Now we have found that the considerable advantages of employing a molten $MgO$-$MgCl_2$ mixture can be utilized in a simple manner, i. e. by increasing the surface of the melt. We have found that the mixtures of anhydrous magnesium chloride or carnallite or other melts, containing magnesium chloride and magnesia within moderate limits, which are rather viscid in the proximity of the melting-point, form sufficiently thin suspensions at more elevated temperatures so that they may be successfully employed for irrigating a tower equipped with filling material. The same is true when, instead of hydrochloric acid gas or carbonyl chloride (or mixtures forming the latter) chlorine is to be used for producing the chlorides and therefore the equivalent portion, at least, of carbon in any reactive form, as powdered coke, charcoal &c. is to be added.

According to our present invention the prepared melt is run through an irrigation tower filled, for instance, with granulated coke. Heat may be applied to the irrigation tower from without, as far as the loss of heat is not compensated by the reaction heat; preferably, however, we employ internal electric heating, the coke filling itself serving as resistance. The reacting gas is introduced from the bottom and flows upwards in counter-current to the irrigating melt the surface of which is increased to a considerable extent by the filling of the tower. The following reacting or chlorinating gases may equally be used: hydrochloric acid, chlorine or agents combining the action of chlorine and carbon, as carbonyl chloride or mixtures forming the latter.

On further investigation we have found that the above described method is also quite adapted for merely dehydrating chlorides of the $MgCl_2$ type which are, at elevated temperatures, subjected to decomposition by splitting off hydrochloric acid and forming oxides, the intermediarily-formed oxide being transformed to anhydrous chloride under the conditions in question. For instance, natural or artificial carnallite when treated in this manner may easily be transformed to molten anhydrous carnallite. The same applies to the hydrates of magnesium chloride, and further to other chlorides of similar composition which on heating are subjected to decomposition, such as calcium, zinc, lithium, cerium chlorides &c. When treating chlorides of high water content, a certain amount of water, which can be split off without hydrolyzing the chloride, may be previously removed by simple heating according to well-known methods, and then the partially dehydrated chlorides may be wholly dehydrated according to the method forming the object of the present invention. The gases flowing in a direction opposite to the melt, as chlorine or hydrochloric acid, may be conducted in a circular course, means being inserted for removing the water absorbed.

The height of the irrigation column and the temperature to be employed will easily be ascertained by experiment, it being understood that a molten final product anhydrous free from oxide is to be withdrawn from the irrigation tower.

We claim:—

1. Process for producing anhydrous metal chlorides exempt from oxides which comprises melting a metal chloride subjected to decomposition when heated alone and running the melt downwards in a heated irrigation tower in counter-current to a current of a gaseous chlorinating agent.

2. Process for producing anhydrous metal chlorides exempt from oxides which comprises melting a metal chloride subjected to decomposition when heated alone, suspending therein an oxygenated compound of the metal, and running the suspension downwards in a heated irrigation tower in counter-current to a current of a gaseous chlorinating agent.

3. Process for producing anhydrous metal chlorides exempt from oxides which comprises melting a metal chloride subjected to decomposition when heated alone with the addition of reactive carbon, and running the melt downwards in a heated irrigation tower in counter-current to a current of a gaseous chlorinating agent.

4. Process for producing anhydrous metal chlorides exempt from oxides which comprises melting a metal chloride subjected to decomposition when heated alone, suspending therein an oxygenated compound of the metal with the addition of reactive carbon, and running the melt downwards in a heated irrigation tower in counter-current to a current of a gaseous chlorinating agent.

5. Process for producing anhydrous metal chlorides exempt from oxides which comprises melting a metal chloride subjected to decomposition when heated alone, running the melt downwards in an irrigation tower, filled with an electric conductor, in counter-current to a current of a gaseous chlorinating agent and passing an electric current through the said conductor.

6. Process for producing anhydrous metal chlorides exempt from oxides which comprises melting a metal chloride subjected to decomposition when heated alone, running the melt in an irrigation tower, filled with granulated coke, downwards in counter-current to a current of a gaseous chlorinating agent and passing an electric current through the coke.

7. Process for producing anhydrous metal chlorides exempt from oxides which comprises melting a metal chloride subjected to decomposition when heated alone with the addition of reactive carbon and running the melt downwards in a heated irrigation tower in counter-current to a current of chlorine.

8. Process for producing anhydrous magnesium chloride exempt from oxides which comprises melting hydrated magnesium chloride and running the melt downwards in a heated irrigation tower in counter-current to a current of a gaseous chlorinating agent.

9. Process for producing anhydrous magnesium chloride exempt from oxides which comprises melting hydrated magnesium chloride, suspending therein magnesia, and running the suspension downwards in a heated irrigation tower in counter-current to a current of a gaseous chlorinating agent.

10. Process for producing anhydrous magnesium chloride exempt from oxides which comprises melting hydrated magnesium chloride, suspending therein magnesia with the addition of reactive carbon, and running the suspension downwards in a heated irrigation tower in counter-current to a current of chlorine.

In testimony whereof we affix our signatures.

MAX JAEGER.
WILHELM MOSCHEL.
ROBERT SUCHY.